(12) United States Patent
Zhang

(10) Patent No.: US 6,909,047 B2
(45) Date of Patent: Jun. 21, 2005

(54) OPTICAL DISC DRIVER ENCLOSURE

(75) Inventor: Xiao Ling Zhang, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/852,940

(22) Filed: May 24, 2004

(65) Prior Publication Data

US 2004/0231876 A1 Nov. 25, 2004

(30) Foreign Application Priority Data

May 24, 2003 (CN) ........................................ 03226516 U

(51) Int. Cl.⁷ .............................. H02G 3/08; H05K 5/02
(52) U.S. Cl. ............................. 174/50; 174/58; 174/63; 220/4.02; 361/685
(58) Field of Search ................................ 174/17 R, 50, 174/58, 63, 66, 67; 220/3.2, 3.8, 4.02, 241, 242; 361/600, 685; 439/535

(56) References Cited

U.S. PATENT DOCUMENTS

| 5,848,718 | A | * | 12/1998 | Colwell ..................... 220/4.02 |
| 6,317,334 | B1 | * | 11/2001 | Abruzzini et al. .......... 361/797 |
| 6,583,949 | B2 | * | 6/2003 | Maiers ..................... 360/97.01 |
| 6,661,677 | B1 | * | 12/2003 | Rumney ..................... 361/818 |
| 6,711,859 | B2 | * | 3/2004 | Bell et al. ..................... 49/501 |
| 6,775,132 | B2 | * | 8/2004 | Chen et al. ................. 361/685 |
| 6,798,652 | B2 | * | 9/2004 | Wang et al. ................ 361/685 |

FOREIGN PATENT DOCUMENTS

CN 95204891.4 12/1996

* cited by examiner

Primary Examiner—Dean A. Reichard
Assistant Examiner—Adolfo Nino
(74) Attorney, Agent, or Firm—Wei Te Chung

(57) ABSTRACT

An optical disc drive enclosure (10) includes a first cover (20) and a second cover (30). The first cover has a bottom plate and two first side plates (22). A locating plate (24) extends inwardly from a front upper edge of each first side plate, and two protrusion plates (26) are formed on an upper edge of each first side plate. The second cover has a top plate (31) and two second side plates (32). A locating slot (34) is formed at a front end of each second side plate, and can engage with the corresponding locating plate. Two cutouts (36) are defined in each second side plate. During assembly, the locating slots engage with the locating plates, with the second cover at an angle to the first cover. The second cover is then rotated downwardly so that the cutouts engage with the protrusion plates and the second side plates are clipped between the first side plates and the protrusion plates. The first cover and the second cover can then be fixed together by a pair of screws (59).

15 Claims, 5 Drawing Sheets

OPTICAL DISC DRIVER ENCLOSURE

BACKGROUND OF THE INVENTION

1. Field of the Invention

The present invention generally relates to an optical disc drive enclosure for mounting a drive housing therein, and more particularly to an enclosure having a first cover and a second cover which can be readily and firmly engaged together to securely mount the drive housing in the enclosure.

2. Description of Related Art

In assembling a typical optical disc drive, a drive housing is secured inside a first cover, then a second cover is mounted on the first cover. A typical example is shown in China Patent No. 95204891.4, wherein the optical disc drive enclosure comprises a first cover and a second cover. Ordinarily, 4 to 6 mounting parts are formed on each side plate of the first cover and the second cover, respectively. These mounting parts engage with each other to combine the first cover and the second cover together. However, there are no guiding means on the first or second covers to aid assembly of the two covers, so the two covers are difficult to properly align before engaging one to the other. Furthermore, once the second cover is engaged improperly to the first cover, it is difficult to disengage the second cover from the first cover. If too much force is used to disengage the two covers, the elements of the optical disc drive in the covers might be damaged.

SUMMARY OF THE INVENTION

Accordingly, an object of the present invention is to provide an optical disc drive enclosure which is easily assembled and disassembled.

In order to achieve the object set out above, an optical disc drive enclosure of the present invention includes a first cover and a second cover. The first cover has a bottom plate and two first side plates extending upwardly from two side edges of the bottom plate. A locating plate extends inwardly from a front upper edge of each first side plate, and two inwardly and upwardly extending protrusion plates are defined on an upper edge of each first side plate. The second cover has a top plate, and two second side plates extending downwardly from two side edges of the top plate. A locating slot is formed at a front end of each second side plate, for engaging with a corresponding locating plate, and a pair of cutouts is defined in each second side plate. During assembly, the locating slots engage with the locating plates and the rear end of the second cover is pressed downwardly so that the cutouts engage with the protrusion plates. The second side plates thereby become clipped between the first side plates and the protrusion plates. The first cover and the second cover can then be secured together using a pair of screws.

Other objects, advantages and novel features of the present invention will become more apparent from the following detailed description when taken in conjunction with the accompanying drawings, in which:

DETAILED DESCRIPTION OF THE INVENTION

Figure 1:
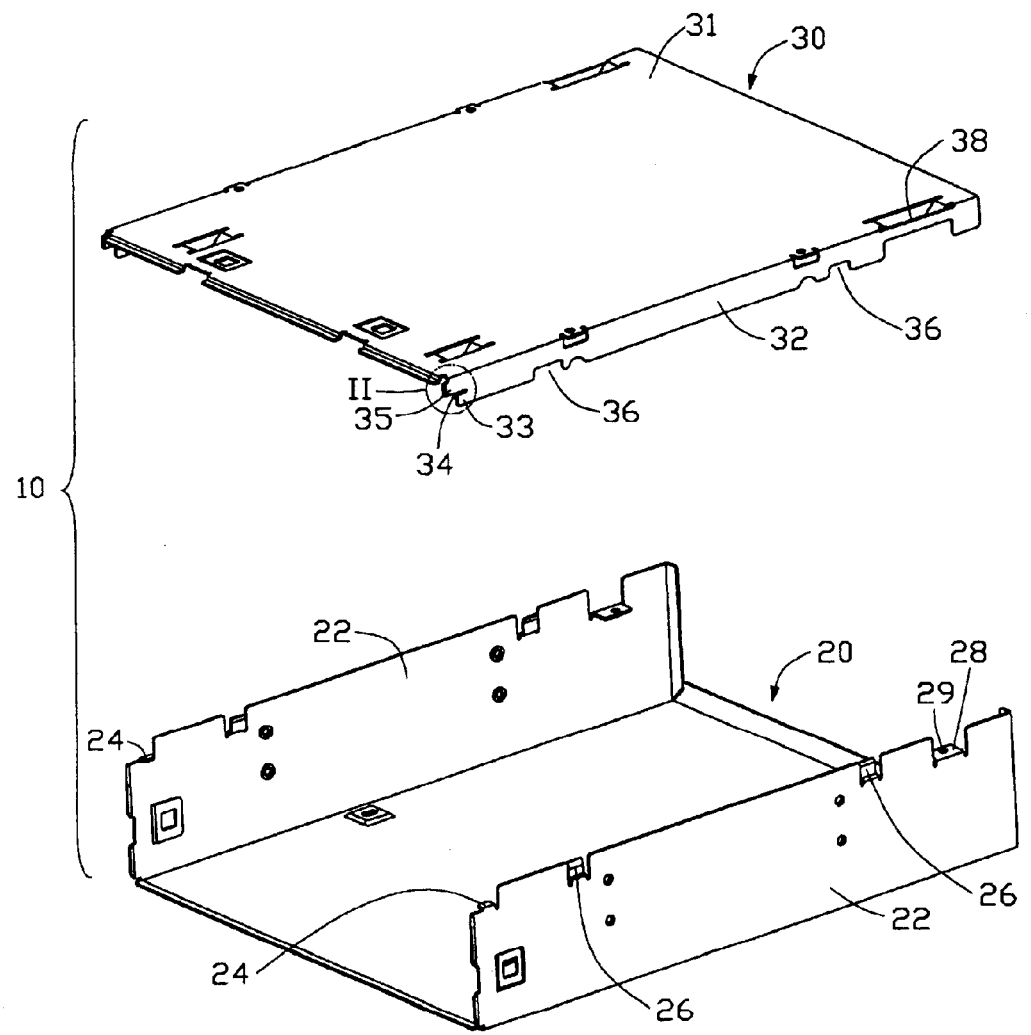
FIG. 1 is an exploded, isometric view of an optical disc drive enclosure in accordance with the present invention.

Reference will now be made to the drawing figures to describe the preferred embodiments of the present invention in detail.

Figure 2:
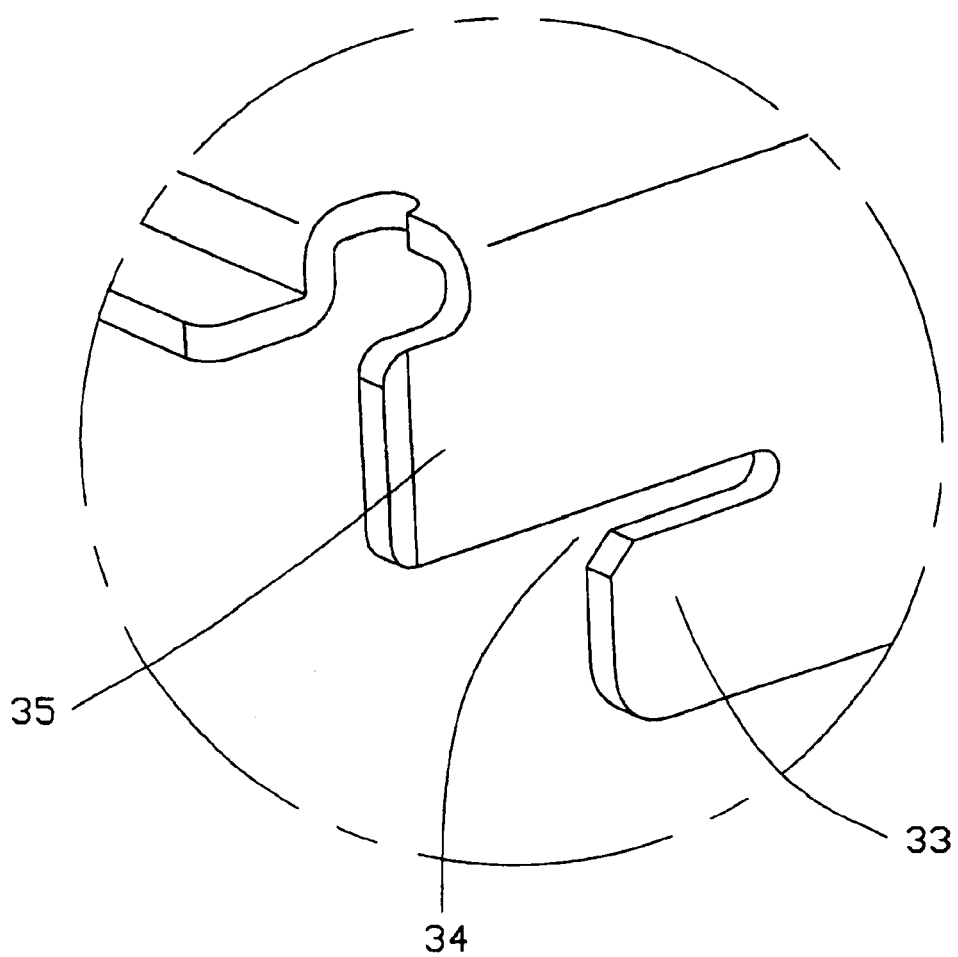
FIG. 2 is an enlarged view of a circled portion II in FIG. 1.

As shown in FIGS. 1–2, an optical disc drive enclosure 10 in accordance with a first embodiment of the present invention includes a first cover 20 and a second cover 30. The first cover 20 has a bottom plate (not labeled) and two first side plates 22. A locating plate 24 extends inwardly and horizontally from an upper edge near a front of each first side plate 22. At least one protrusion plate 26 is stamped inwardly and upwardly at the upper edge of each first side plate 22. Each protrusion plate 26 is parallel to the first side plate 22, and spaced a certain distance therefrom. A locking plate 28 extends inwardly and horizontally from an upper edge near a rear of each first side plate 22. A threaded hole 29 is defined in the locking plate 28.

The second cover 30 has two second side plates 32 and a top plate 31. A locating slot 34 is defined in a front end of each second side plate 32 for engaging with the locating plates 24 of the first cover 20. Each locating slot 34 is defined between an upper tab 35 and a lower tab 33. The lower tab 33 is shorter than the upper tab 35, and the width of the locating slot 34 is a little wider than a thickness of the locating plate 24 of the first cover 20. By means of the locating slots 34, the second cover 30 can engage with the locating plates 24 of the first cover 20 at an oblique angle, and the second cover 30 can then be rotated about the locating plates 24 to close against the first cover 20. A pair of cutouts 36 is defined in a lower edge of each second side plate 32, which cutouts 36 can cooperate with the corresponding protrusion plates 26 of the first cover 20. A pair of concavities 38 is formed at a rear end of the top plate 31, the center of each concavity 38 being flat. A through hole (not shown) is defined in a center of each concavity 38.

Figure 3:
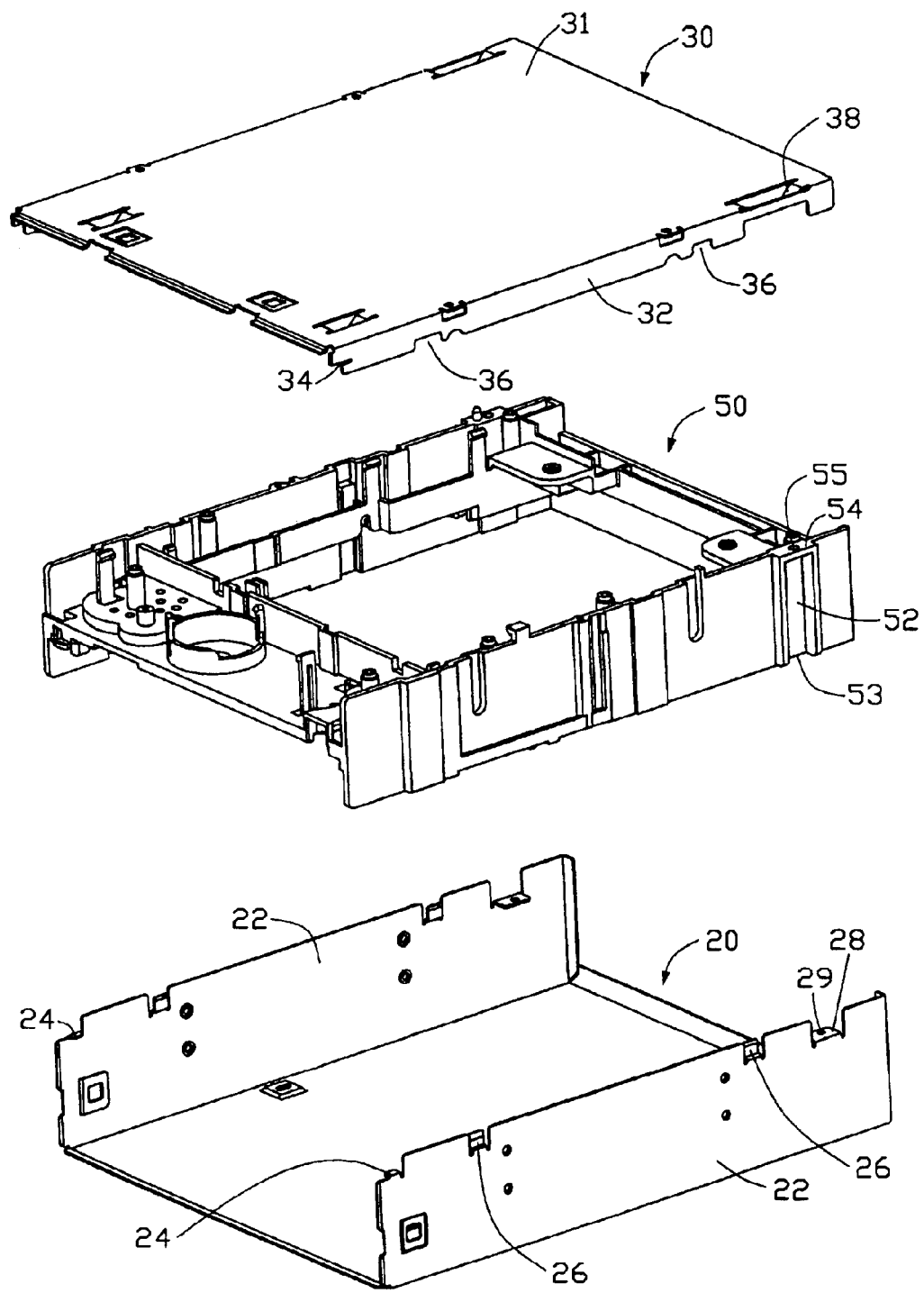
FIG. 3 is an exploded, isometric view of the optical disc drive enclosure with a drive housing in accordance with the present invention.
Figure 4:
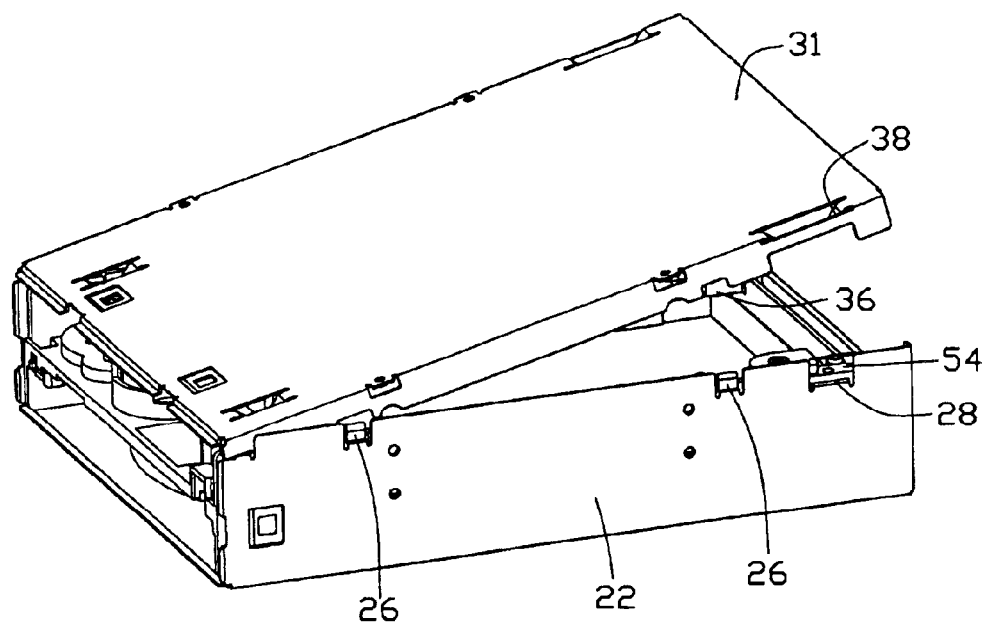
FIG. 4 is an isometric, partially assembled view of FIG. 3.
Figure 5:
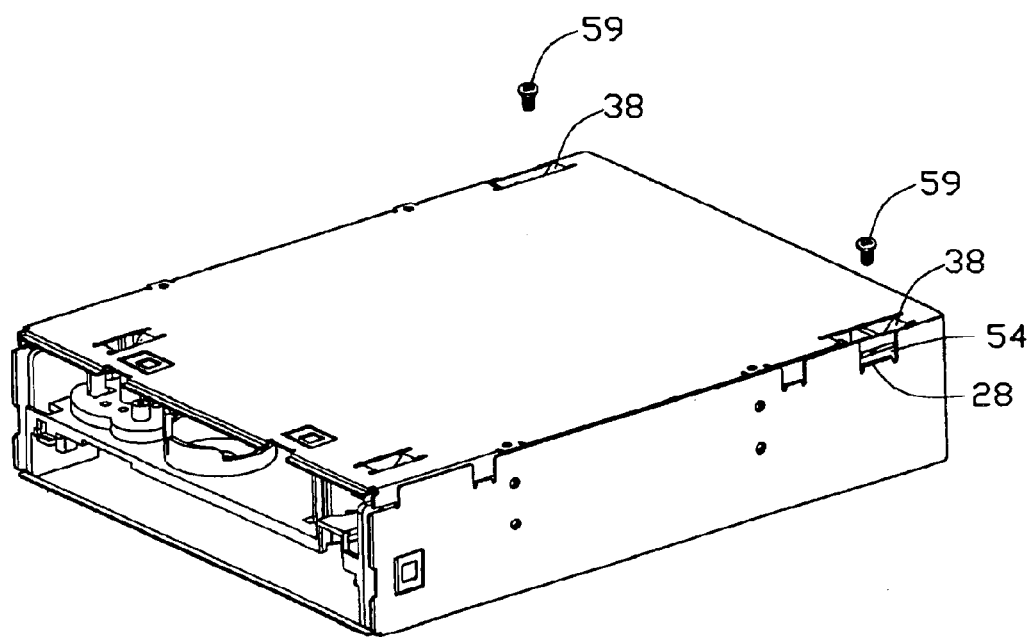
FIG. 5 is an isometric assembled view of FIG. 3 with two screws yet to be assembled.

Referring also to FIGS. 3–5, the optical disc drive enclosure 10 is used to mount a drive housing 50 therein. A groove 52 is defined in each of two side walls (not labeled) of the drive housing 50, the groove 52 accommodating the locking plates 28 of the first cover 20. Each groove 52 has an opening 53 at a lower end and a holding plate 54 at an upper end. A through hole 55 is defined through the holding plate 54. A width of each locking plate 28 is designed to fit inside the width of the groove 52.

In assembly, the openings 53 of the drive housing 50 are aligned with the locking plates 28 of the first cover 20, and then the drive housing 50 slides into the first cover 20, with the locking plates 28 sliding along the grooves 52 until the holding plates 54 press against the locking plates 28. The through holes 55 of the drive housing 50 align with corresponding threaded holes 29 of the first cover 20. The front end of the second cover 30 is then engaged with the front end of the first cover 20, with the locating slot 34 of the second cover 30 hooking with the locating plate 24 of the first cover 20. At this time, the first cover 20 and the second cover 30 are at an oblique angle position relative to each other. Then the second cover 30 pivots about an axis defined by the points of engagement between the locating slots 34 and the locating plates 24 to a covering position on the first cover 20. In this position, the cutouts 36 engage with the protrusion plates 26 to clip the second side plates 32 between the first side plates 22 and the protrusion plates 26. At the same time, the concavities 38 of the second cover 30 press against the holding plates 54 of the drive housing 50, and the through hole (not shown) of each concavity 38 is aligned with the corresponding through hole 55 of the drive housing 50. Finally, two screws 59 respectively pass through the through holes (not shown) of the concavities 38 and the through holes 55 to engage with the threaded holes 29, thereby securing the second cover 30 to the first cover 20.

To disassemble, the screws 59 are first unscrewed. Then the second cover 30 can be pivoted upwardly from a rear end thereof and drawn backwardly relative to the first cover 20. The drive housing 50 is then easily withdrawn from the first cover 20.

Figure 6:
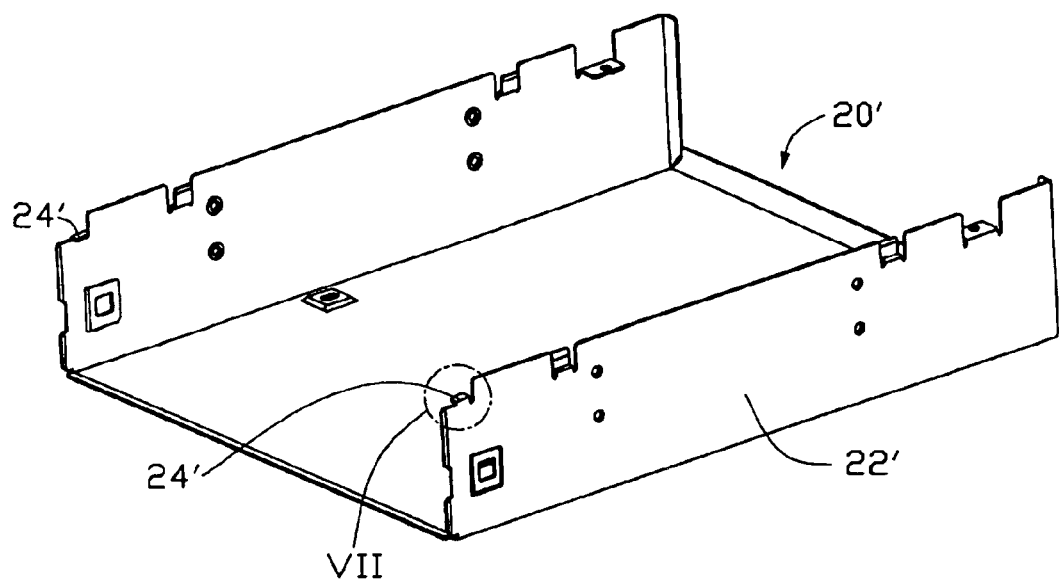
FIG. 6 is another embodiment of a first cover in accordance with the present invention.
Figure 7:
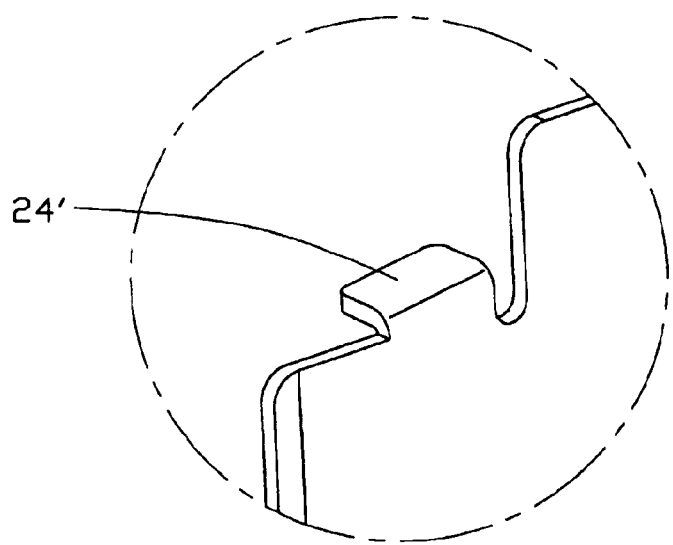
FIG. 7 is an enlarged view of a circled portion VII in FIG. 6.

FIGS. 6–7 show a first cover 20' of an optical disc drive enclosure 10 in accordance with an alternative embodiment of the present invention. The only difference between the first cover 20' and the first cover 20 of the first embodiment is that a locating plate 24' extending inwardly from an upper edge near a front of each first side plate 22' of the first cover 20' is tilted so that the front end is a little lower than the back end. This difference makes the locating plates 24' more easily engagable with the locating slots 34 of the second cover 30. Moreover, the second cover 30 can pivot around the locating plates 24' through a larger angle than it can in the first embodiment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical disc drive enclosure adapted to mount a drive housing therein, the drive enclosure comprising:
   a first cover comprising a bottom plate and a first side plate extending upwardly from each of two opposite sides of the bottom plate, a locating plate extending inwardly from a front end of each first side plate, at least a protrusion plate being stamped inwardly and upwardly at a top edge of each first side plate; and
   a second cover comprising a top plate and a second side plate extending downwardly from each of two opposite sides of the top plate, a locating slot being defined on a front of each second side plate;
   wherein the locating slots are engaged with the locating plates, and the second side plates are rotatably clipped between the first side plates and the protrusion plates.

2. The optical disc drive enclosure as recited in claim 1, wherein each locating slot is defined between an upper tab on one side thereof and a lower tab on another side thereof, and the lower tab is shorter than the upper tab.

3. The optical disc drive enclosure as recited in claim 2, wherein a width of each locating slot is greater than a thickness of each locating plate.

4. The optical disc drive enclosure as recited in claim 3, wherein the second cover is rotatably pivoted through a certain angle about an axis by points of engagement of the locating plates and the locating slots.

5. The optical disc drive enclosure as recited in claim 1, wherein at least a cutout is defined in a lower edge of each second side plate, the cutouts engage with the corresponding protrusion plates, and the second side plates are thereby clipped between the first side plates and the protrusion plates.

6. The optical disc drive enclosure as recited in claim 1, wherein a locking plate extends inwardly and horizontally from an upper edge near a rear of each first side plate, and a threaded hole is defined through the locking plate.

7. The optical disc drive enclosure as recited in claim 6, wherein a concavity is formed at a rear end of the top plate, the center of the concavity is flat, and a through hole is defined in the center of the concavity.

8. A drive enclosure adapted to mount a drive housing therein, the drive enclosure comprising:
   a first cover comprising a bottom plate and a first side plate extending upwardly from each of two opposite sides of the bottom plate, a locating plate extending inwardly from a front end of each of the first side plates, a locking plate extending inwardly from an upper edge of each first side plate; and
   a second cover comprising a top plate and a second side plate extending downwardly from each of two opposite sides of the top plate, a locating slot being defined on a front end of each second side plate, the locating slots being engageable with the corresponding locating plates, a concavity being defined on the top plate, the concavity cooperating with the locking plate to mount the second cover on the first cover.

9. The drive enclosure as recited in claim 8, wherein the locating plates extend inwardly and parallel to the bottom plate.

10. The drive enclosure as recited in claim 8, wherein the locating plates extend inwardly and at an angle to the bottom plate, and the front end of each locating plate is lower than the back end.

11. The drive enclosure as recited in claim 8, wherein at least one protrusion plate is stamped inwardly from an upper edge of each first side plate, and the protrusion plate is parallel to the corresponding first side plate.

12. The drive enclosure as recited in claim 11, wherein at least one cutout is defined in each second side plate, and the cutouts engage with corresponding protrusion plates to clip the second side plates between the first side plates and the protrusion plates.

13. The drive enclosure as recited in claim 8, wherein a threaded hole is defined through each locking plate.

14. The drive enclosure as recited in claim 13, wherein a through hole is defined in a center of each concavity for cooperating with the corresponding threaded hole to allow a screw to fix the second cover on the first cover.

15. An enclosure comprising:
   a first cover defining a bottom plate and two opposite first side plates extending upwardly from the bottom plate;
   a protrusion plate stamped from an upper end of one of the first side plates in a parallel but offset manner;
   a second cover defining a top plate and two opposite second side plates extending downwardly from the top plate and aligning with the first side plates;
   a locating tab located around an end portion of one of an aligned first side plate and second side plate; and
   a locating slot formed around an end portion of the other of said aligned first side plate and second side plate; wherein
   one of the second side plates is sandwiched between the protrusion plate and the corresponding first side plate; whereby
   the second cover is pivotally assembled to the first cover, with the second cover pivoting around said locating tab.

* * * * *